United States Patent [19]
Willsey

[11] Patent Number: 4,799,423
[45] Date of Patent: Jan. 24, 1989

[54] EGG CONTENTS SEPARATING MECHANISM

[75] Inventor: Charles H. Willsey, Topeka, Kans.

[73] Assignee: Seymour Foods, Inc., Topeka, Kans.

[21] Appl. No.: 145,100

[22] Filed: Jan. 19, 1988

[51] Int. Cl.$^4$ ................................................. A23J 1/09
[52] U.S. Cl. ......................................... 99/500; 99/497
[58] Field of Search ................................ 99/495–500, 99/568, 577–582; 426/490, 614, 478–480

[56] References Cited

U.S. PATENT DOCUMENTS

| | | | |
|---|---|---|---|
| 1,214,720 | 2/1917 | Sobeck | 99/500 |
| 3,133,569 | 5/1964 | Shelton et al. | 99/498 |
| 4,137,837 | 2/1979 | Warren | 99/499 |
| 4,321,864 | 3/1982 | Willsey | 99/500 |
| 4,541,330 | 9/1985 | Fujimura | 99/500 |

*Primary Examiner*—Timothy F. Simone
*Attorney, Agent, or Firm*—Litman, McMahon & Brown

[57] ABSTRACT

A mechanism for separating the yolk and albumen contents of eggs comprises a frame mounting a yolk cup assembly for receiving the yolk and albumen contents of a cracked egg and an albumen pan positioned below the yolk cup assembly for receiving the albumen egg contents therefrom. The yolk cup assembly includes a funnel ring with a downwardly-converging, tapered side wall and upper and lower openings. A retaining bowl is mounted on the funnel ring side wall and forms a receptacle therewith. The retaining bowl is partly spaced from the yolk cup assembly side wall to provide an opening therebetween through which albumen can flow into the albumen pan.

22 Claims, 1 Drawing Sheet

U.S. Patent  Jan. 24, 1989  4,799,423
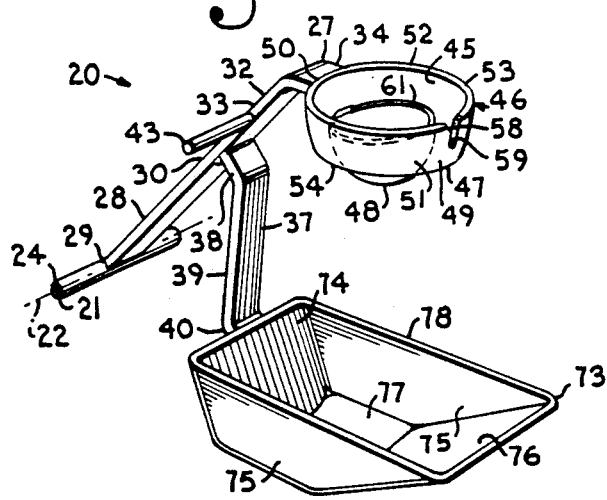
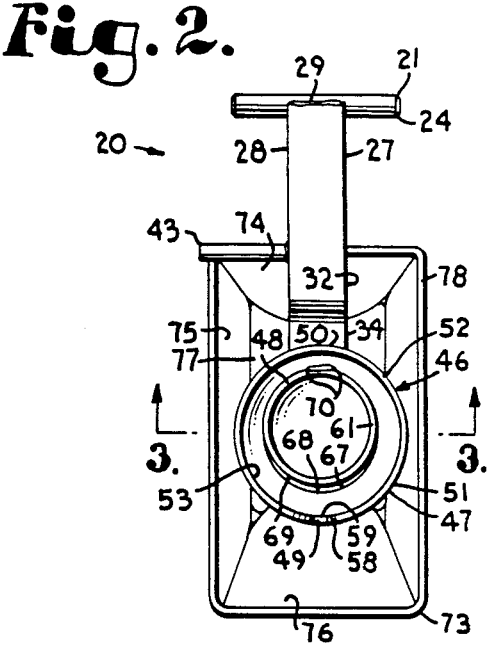
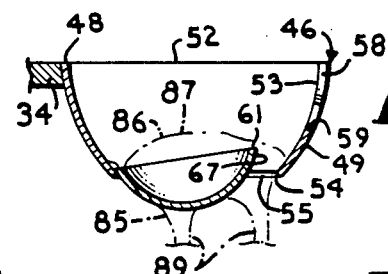
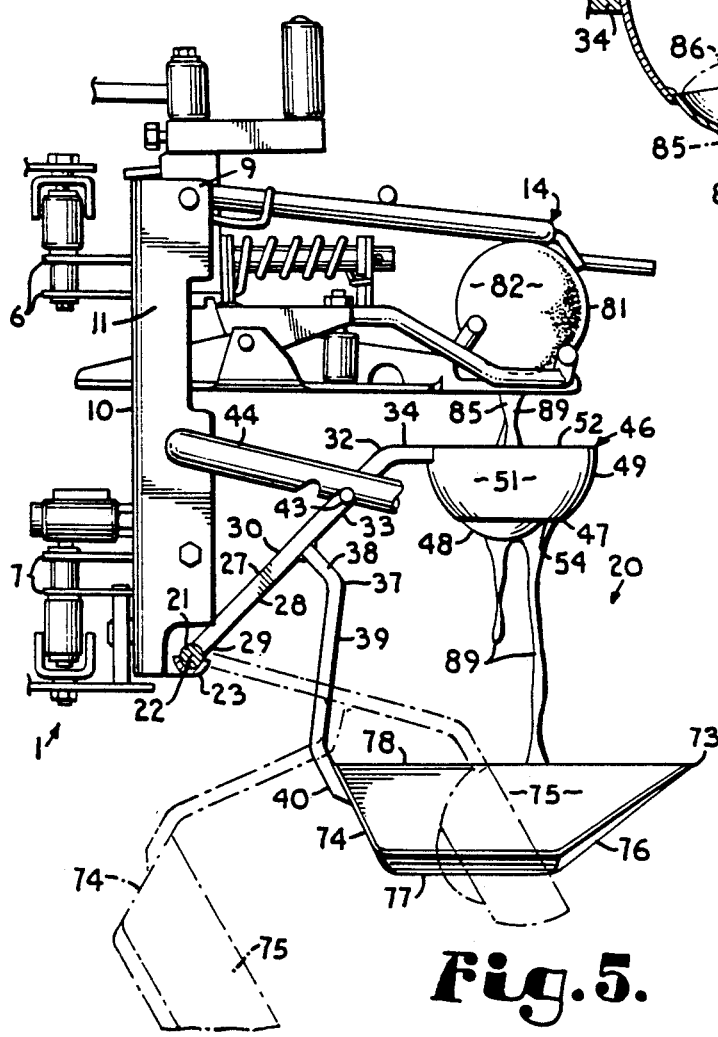
Fig. 1.
Fig. 2.
Fig. 3.
Fig. 4.
Fig. 5.

EGG CONTENTS SEPARATING MECHANISM

BACKGROUND OF THE INVENTION

1. Field of the Invention.

The present invention relates generally to egg processing equipment and in particular to a mechanism for separating the yolk and albumen contents of an egg.

2. Description of the Relevant Art.

Eggs are used in commercial quantities as ingredients in food and other products. Generally, three distinct types of egg products are in large demand: 1) egg yolks, which generally command the highest price; 2) albumen or egg white; and 3) whole egg comprising both yolk and albumen. Automated machines have heretofore been devised for the high-speed processing of eggs in commercial quantities.

Two such machines are disclosed in my prior U.S. Pat. Nos. 3,480,056 and 4,321,864. Both of these machines include egg breaking and contents separating assemblies linked together to form endless conveyor chain assemblies driven around sprockets in horizontal, generally triangular travel paths. Each egg cracking and separating assembly is adapted to receive an egg and perform various processing functions at operational stations along its travel path. Specifically, the operational functions include receiving and cradling an egg with its longitudinal axis parallel to the travel path, cracking the eggshell, separating the cracked eggshell halves, dumping the egg contents into a separating mechanism, separating the yolk and albumen contents, and discharging the yolk and albumen into separate receptacles. Along the conveyor paths of travel there are stations at which defective and whole egg (i.e. broken yolk) contents can be detected and discharged, and stations at which the separating mechanisms are washed.

Ideally, egg processing equipment should be highly efficient in operation, capable of a relatively high throughput rate, and designed to minimize yolk breakage. Another objective of egg processing equipment is to achieve the greatest possible degree of separation between the yolk and albumen egg contents. The price of bulk egg yolk is generally based on its solids content, with the maximum theoretical solids content being about 48% to 49%. Bulk egg yolk comprising 43% solids is generally commercially acceptable. However, bulk egg yolk with higher solids content percentages normally brings a higher price. The solids content of processed, bulk egg yolk differs from the theoretical solids content limits because of the small amounts of albumen which are left clinging to the egg yolks after the separation process.

A drainage slot designed specifically to maximize yolk/albumen separation is provided in the yolk bowl of the separating mechanism shown in my U.S. Pat. No. 4,111,111. My aforementioned Willsey U.S. Pat. No. 4,321,864 discloses yet another configuration for a yolk bowl with a slot formation and an additional aperture for discharging the albumen. While all of the separating mechanisms disclosed in my aforementioned previous patents have achieved a degree of success in separating yolk and albumen egg contents, none provides the advantages and features of the egg contents separating mechanism of the present invention.

SUMMARY OF THE INVENTION

In the practice of the present invention a mechanism for separating egg yolk and albumen contents is mounted on an egg cracking/separating assembly below a cracking mechanism. The separating mechanism includes a frame pivotably mounted on the cracking/separating assembly whereby the separating mechanism is pivotable between a drainage position and a discharge position. The separating mechanism includes a yolk cup assembly with a funnel ring having upper and lower openings and a side wall. A retaining bowl is mounted in the funnel ring and forms a receptacle therewith adapted to receive the yolk and albumen egg contents. The receptacle has a crescent-shaped opening between the retaining bowl and the funnel ring. An albumen pan is mounted on the frame below the yolk cup assembly and receives albumen that drains from the yolk cup assembly. In the drainage position albumen drains from the yolk cup assembly into the albumen pan. In the discharge position the separating mechanism discharges the yolk contents from the yolk cup assembly and the albumen contents from the albumen pan.

OBJECTS OF THE INVENTION

The principal objects of the present invention are: to provide a mechanism for separating egg yolk and albumen contents; to provide such a mechanism which is adapted for use with an egg cracking/separating assembly; to provide such a mechanism which is adapted for use with high-speed, automated egg processing equipment; to provide such a mechanism which achieves a relatively high degree of separation between the egg yolk and albumen contents; to provide such a mechanism which minimizes yolk sac breakage; to provide such a mechanism which delivers egg yolks with relatively high solids content percentages; to provide such a mechanism which is efficient in operation, easy to manufacture, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of an egg contents separating mechanism embodying the present invention.

FIG. 2 is a top plan view of the separating mechanism.

FIG. 3 is a vertical, cross-sectional view of the separating mechanism taken generally along line 3—3 in FIG. 2.

FIG. 4 is an enlarged, vertical, cross-sectional view of the separating mechanism, particularly showing a yolk cup assembly thereof and taken generally along line 4—4 in FIG. 3.

FIG. 5 is a side elevational view of an egg cracking/separating assembly incorporating the separating mechanism.

DETAILED DESCRIPTION OF THE PREFERRED EMBODIMENT

I. Introduction

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Front and rear orientations are to the right and left respectively in FIG. 5.

For the purpose of illustration and to aid in fully understanding the operation and advantages of the presently preferred form of the invention, reference may be had to my U.S. Pat. No. 4,321,864, which discloses an egg breaking and contents separating machine. The machine disclosed therein includes a plurality of egg cracking and separating assemblies forming an endless conveyor chain and each including a cracking mechanism and an egg contents separating mechanism. While the illustrated form of the present separating mechanism has been designed for incorporation in a machine of the type disclosed in my U.S. Pat. No. 4,321,864, it will be understood that it is not intended to limit the use of the present mechanism to such machines.

II. Cracking/Separating Assembly

Referring to the drawings in more detail, a driven, endless chain conveyor 1 mounts a plurality of cracking/separating assemblies 2 for movement along a path of movement around the conveyor 1. Each cracking/separating assembly 2 includes upper and lower pairs of spaced, parallel linking plated 6, 7 connected to the conveyor 1 and to a vertically disposed, channel support bracket 9 with a back web 10 and a pair of side flanges 11 extending outwardly therefrom. A cracking mechanism 14 is mounted generally between the side flanges 11 at an upper portion of the support bracket 9. Without limitation on the generality of useful structures that could be employed with the separating mechanism of the present invention, the cracking mechanism 14 may comprise, for example, a cracking mechanism such as that shown in my U.S. Pat. No. 4,321,864.

III. Egg Contents Separating Assembly

An egg contents separating mechanism 20 is mounted on a lower portion of the channel support bracket 9 generally between the side flanges 11 by a frame 27 including a cross pin 21 extending horizontally between the bracket side flanges 11 along a pivotal axis 22. The cross pin 21 is journaled in open-top socket members 23 each projecting inwardly from a respective bracket side flange 11 and pivotably receiving a respective cross pin end 24.

The frame 27 also includes a cross pin section 28 with a back end 29 mounted on the cross pin 21 between its ends 24 and a front end 30. The frame 27 further includes a yolk cup section 32 with a back leg 33 connected to the cross pin section front end 30 and a front leg 34. The front leg 34 angles somewhat downwardly from the back leg 33. Still further, the frame 27 further includes an albumen tray section 37 with an upper leg 38 connected to the cross pin section front end 30 and the yolk cup section back leg 33, an intermediate leg 39 extending downwardly from the upper leg 38, and a lower leg 40 extending downwardly from the intermediate leg 39. The intermediate leg 39 angles somewhat rearwardly from the upper leg 38, and the lower leg 40 angles somewhat forwardly from the intermediate leg 39. Preferably the cross pin and yolk cup sections 28, 32 comprise an integral unit with the albumen tray section 37 attached at their intersection, for example, by welding. A latch pin 43 projects laterally from the back leg 33 of the yolk cup section 32 and is releasably captured by a notched latch arm 44.

A yolk cup assembly 46 with a front 49 and a back 50 is mounted on the yolk cup section front leg 34 and generally comprises a funnel ring 47 and a retaining bowl 48 that form a receptacle 45. The funnel ring 47 has the general configuration of a frustum of an ellipsoid, with a tapered, annular side wall 51 converging downwardly from an upper rim 52 defining a generally circular upper opening 53 to a lower rim 54 defining a generally circular lower opening 55. The lower opening 55 has a diameter substantially less than a diameter of the upper opening 53. The front leg 34 of the frame yolk cup section 32 is attached, as by welding, to the side wall 51 adjacent to the upper rim 52 at the yolk cup assembly back 50. An overflow slot 58 is formed in the side wall 51 at the yolk cup assembly front 49 and is open at the upper rim 52. The overflow slot 58 terminates at a bottom end 59 in spaced relation above the funnel ring lower rim 54.

The retaining bowl 48 is downwardly-concave and includes a rim 61 having a diameter approximately equal to that of the funnel ring lower opening 55. The retaining bowl 48 is attached at its rim 61 to the side wall 51 adjacent the lower rim 54, as by welding, at the yolk cup assembly back 50. The funnel ring lower rim 54 and the retaining bowl rim 61 are positioned in close proximity to each other at the yolk cup assembly back 50, but the retaining bowl rim 61 is positioned in spaced relation (preferably about one-fourth to three-fourths of an inch) above the frontmost portion 56 of the funnel ring lower rim. Thus, the retaining bowl rim 61 lies in a plane that slopes upwardly and outwardly at an acute, dihedral angle from a plane that contains the funnel ring lower rim 54.

A crescent-shaped opening 67 to the receptacle is formed between a convex opening margin 68 along the inside of the funnel ring side wall 51 and a concave opening margin 69 along the retaining bowl rim 61. The crescent-shaped opening 67 extends most of the way around the retaining bowl rim 61 and terminates at a spaced pair of ends 70 whereat the opening margins 68, 69 converge on either side of the yolk cup assembly back 50. The retaining bowl 48 is preferably formed of relatively lightweight, malleable material (e.g. stainless steel) so that it can be bent upwardly or downwardly to adjust the size of the opening 67. Although openings 67 of various sizes can be formed by adjusting the retaining bowl 48, it has been found that an opening 67 with a maximum clearance at the front in the range of one-eighth to three-eighths of an inch is well suited for separating egg contents.

An albumen pan 73 includes a back wall 74 mounting the lower leg 40 of the frame albumen pan section 37, a pair of downwardly converging side walls 75, a front wall 76 that converges downwardly with the back wall 74, and a rounded bottom 77. The albumen pan walls 74–76 terminate at an upper rim 78 in a plane substantially parallel to planes that contain the funnel ring upper and lower rims 52, 54.

IV. Operation

The cracking/separating assembly 2 is operated automatically and manually in the manner described in my U.S. Pat. No. 4,321,864. At a loading station an egg 81 is deposited in the cracking mechanism 14, which cracks the eggshell and separates the eggshell halves 82.

When the eggshell halves 82 are separated, the cracking mechanism 14 is preferably in a lowermost position directly over the yolk cup assembly 46, the latter being in a substantially level position with the respective planes containing the funnel ring rims 52, 54 and the albumen pan rim 78 being substantially horizontal. After the eggshell halves 82 are separated, the cracking mechanism 14 preferably pivots upwardly and the cracking/separating assembly 2 travels along the movement path 3 in a drainage configuration with the separating mechanism 20 substantially level. When the eggshell halves 82 separate, the yolk 86 and most of the albumen 85 drop immediately to the yolk cup assembly 46. However, a certain amount of albumen 85 may cling to the eggshell halves 82 and slowly drip or drain into the yolk cup assembly 46. Such albumen drippings are commonly referred to as "stringers" 89.

The cracking mechanism 14 and the separating mechanism 20 are preferably close enough when the eggshell halves 82 separate that the yolk 86 will land with its sac 87 unbroken in the retaining bowl 48 (FIG. 4). The fall of the yolk 86 is somewhat cushioned by the albumen 85 that surrounds it. In a drainage psotion, the yolk 86 is supported on the retaining bowl 48 in spaced relation from the funnel ring side walls, except possibly at the yolk cup assembly back 50. The albumen 85 is discharged from the yolk cup assembly 46 through the overflow slot 58 and the crescent-shaped opening 67. The configurations of the funnel ring 47 and the retaining bowl 48 cooperate to maximize the separation of the albumen 85 and the yolk 86. Specifically, the opening 67 almost completely surrounds the retaining bowl 48 and the yolk 86 supported thereby. Thus, the albumen 85 is efficiently shed and drained from the yolk 86 and the yolk cup assembly 46. If a small amount of albumen fills the retaining bowl 48 when the egg contents 85, 86 initially drop into the yolk cup assembly 46, the yolk 86 should substantially displace such a small quantity of albumen 85, which would then overflow the retaining bowl rim 61 and drain with the remainder of the albumen 85. Separation is also facilitated because the rearmost part of the funnel ring side wall 51 that the yolk 86 may engage is located directly over the rearmost portions of the funnel ring lower opening 55 and the retaining bowl rim 61, whereat the funnel ring 47 and the retaining bowl 48 are connected. Since these two contact areas might inhibit the drainage flow of the albumen 85, they are positioned one over the other so that the drainage flow from other, more freely-flowing portions of the yolk 86 is not affected and can freely pass through the crescent-shaped opening 67.

Further cooperation to enhance separation is achieved because of the concave configuration of the retaining bowl 48, to which the egg yolk 86 conforms quite closely whereby albumen is forced over the retaining bowl rim 61. Preferably the retaining bowl 48 is relatively shallow so that the yolk 86 protrudes above the retaining bowl rim 61 whereby the yolk 68 does not tend to "float" on a quantity of the albumen 85 trapped in the retaining bowl 48. The rearward-and-downward slope of a plane that contains the retaining bowl rim 61 also facilitates drainage with the separating mechanism 20 in its drainage position (FIG. 5, solid lines). Albumen caught by the retaining bowl 48 thus tends to flow rearwardly for discharge in proximity to the opening ends 70. The absence of supporting structure across the receptacle 67 further facilitates the passage of the albumen 85 therethrough.

The albumen 85 drained from the yolk cup assembly 46 is captured in the albumen pan 73. The movement path of the cracking/separating assembly 2 preferably includes a drainage portion with the cracking/separating assembly 2 in its drainage configuration for a sufficient length of time to separate a relatively high portion of the albumen 85 from the yolk 86.

Upon the cracking/separation assembly 2 reaching a discharge station (not shown), the latch arm 44 is raised to release the latch pin 43 whereby the separating mechanism 20 can rotate to a discharge position, which is indicated in phantom line in FIG. 5. With the separating mechanism 20 in its discharge position, the yolk contents 86 of the yolk cup assembly 46 and the albumen contents 85 of the albumen pan 73 are discharged to separate receiving vessels (not shown). Preferably the separating mechanism 20 is supported in its discharge position by a cam rail or similar structure (not shown). With the separating mechanism 20 in its discharge position, the albumen contents 85 of the albumen pan 73 discharge readily over the front wall 76 and the yolk contents of the yolk cup assembly discharge readily over the upper rim 52 of the funnel ring 47 in the vicinity of the overflow slot 58. The yolk 86 slides easily from the yolk cup assembly 46.

With the egg contents separating mechanism 20 of the present invention, bulk yolk 86 with a relatively high solids content percentage can be obtained.

It is to be understood that while certain forms of the present invention have been illustrated and described herein, it is not to be limited to the specific forms or arrangement of parts described and shown.

What is claimed and desired to be secured by Letters Patent is as follows:

1. A mechanism for separating egg yolk and albumen contents, which comprises:
    (a) a frame;
    (b) a yolk cup assembly mounted on said frame and including:
        (1) an annular funnel ring with upper and lower openings, said funnel ring including a lower rim defining said lower opening and lying in a plane;
        (2) a concave retaining bowl mounted on said funnel ring and adapted to receive said yolk, said retaining bowl including a rim lying in a plane that slopes with respect to said funnel ring lower rim plane;
        (3) said retaining bowl being positioned partly within said funnel ring lower opening; and
        (4) said funnel ring and said retaining bowl defining a receptacle and being in partlyspaced relation whereby an opening to said receptacle is defined; and
    (c) an albumen pan mounted on said frame in spaced relation below said yolk cup assembly, said albumen pan being adapted to receive albumen from said yolk cup assembly.

2. The separating mechanism according to claim 1 wherein:

(a) said yolk cup assembly includes a front and a back; and (b) said retaining bowl rim plane slopes downwardly from front to back with respect to said funnel ring lower rim plane.

3. The separating mechanism according to claim 2 wherein:

(a) said funnel ring and said retaining bowl are connected together at said yolk cup assembly back.

4. The separating mechanism according to claim 3 wherein:

(a) said receptacle opening has a crescent-shaped configuration with spaced opposite ends positioned adjacent said yolk cup assembly back.

5. The separating mechanism according to claim 4 wherein said receptacle opening includes:

(a) a convex receptacle opening margin at said funnel ring; and (b) a concave opening margin at said retaining bowl rim.

6. A mechanism for separating egg yolk and albumen contents, which comprises:

(a) a frame;

(b) a yolk cup assembly mounted on said frame and including:

(1) an annular funnel ring with upper and lower openings, said funnel ring including a lower rim defining said lower opening and lying in a plane;

(2) a concave retaining bowl mounted on said funnel ring and adapted to receive said yolk, said retaining bowl including a rim lying in a plane that slopes with respect to said funnel ring lower rim plane; and (3) said funnel ring and said retaining bowl defining a receptacle and being in partlyspaced relation whereby an opening to said receptacle is defined; and (c) an albumen pan mounted on said frame in spaced relation below said yolk cup assembly, said albumen pan being adapted to receive albumen from said yolk cup assembly.

7. The separating mechanism according to claim 6 wherein:

(a) said funnel ring includes upper and lower openings; and (b) said retaining bowl is positioned partly within said funnel ring lower opening.

8. The separating mechanism according to claim 7 wherein:

(a) said receptacle opening is located adjacent to said funnel ring lower opening.

9. The separating mechanism according to claim 6, which includes:

(a) a drainage position with said funnel ring and said albumen pan substantially level; and (b) a discharge position with said yolk cup assembly and albumen pan tipped below their respective drainage positions for discharging their respective egg yolk and albumen contents.

10. The separating mechanism according to claim 9 wherein:

(a) said separating mechanism is pivotable about a pivotal axis associated with said frame for movement between its drainage and discharge positions.

11. In combination with an assembly for cracking eggs and separating the yolk and albumen contents thereof including a cracking mechanism, the improvement of a mechanism for separating the egg yolk and albumen contents, which comprises:

(a) a yolk cup assembly including:

(1) an annular funnel ring having a side wall, an upper rim defining a generally circular upper opening and a lower rim defining a generallycircular lower opening;

(2) a concave retaining bowl having a generally circular rim; and (3) a yolk cup receptacle defined by said side wall and said retaining bowl, said yolk cup receptacle being adapted to receive substantially the entire yolk and albumen contents from said cracking mechanism; and (4) retaining bowl mounting means for mounting said retaining bowl on said side wall with at least a portion of said side wall whereby an opening to said yolk cup assembly receptacle is formed; and (b) yolk cup assembly mounting means for mounting said yolk cup assembly below said cracking mechanism whereby said yolk cup receptacle is positioned to receive said egg yolk and albumen contents.

12. The separating mechanism according to claim 11, which includes:

(a) said retaining bowl being mounted on said funnel ring by said retaining bowl mounting means with said retaining bowl rim adjacent said funnel ring lower rim.

13. The separating mechanism according to claim 12 wherein:

(a) said yolk cup assembly includes a front and a back; and (b) said retaining bowl is attached to said funnel ring at said yolk cup assembly back.

14. The separating mechanism according to claim 13 wherein:

(a) said retaining bowl rim is partly positioned in spaced relation from said funnel ring side wall whereby said receptacle opening has a crescent-shaped configuration with opposite ends positioned adjacent said yolk cup assembly back.

15. The separating mechanism according to claim 13 wherein:

(a) said funnel ring lower rim lies in a plane; and (b) said retaining bowl rim lies in a plane that converges rearwardly with respect to said plane containing said funnel ring lower rim.

16. The separating mechanism according to claim 15 wherein:

(a) said funnel ring lower rim and said retaining bowl rim have substantially equal diameters.

17. The separating mechanism according to claim 13 wherein:

(a) said retaining bowl is fastened to said side wall with said retaining bowl rim in proximity to said funnel ring lower rim at said yolk cup assembly back; and (b) said retaining bowl rim is positioned above said funnel ring lower rim at said yolk cup assembly front.

18. The separating mechanism according to claim 11, which includes:

(a) a slot formed in said funnel ring side wall at said yolk cup assembly front, said slot extending downwardly from and being open at said funnel ring upper rim.

19. The separating mechanism according to claim 11, which includes:
 (a) an albumen pan with an upper rim and positioned in spaced relation below said yolk cup assembly and adapted to receive said albumen contents from said yolk cup assembly; and
 (b) said yolk cup assembly mounting means mounting said albumen pan beneath said yolk cup assembly.

20. The separating mechanism according to claim 19 wherein:
 (a) said yolk cup assembly mounting means comprises a frame with a yolk cup section attached to said yolk cup assembly and an albumen pan section attached to said albumen pan.

21. The separating mechanism according to claim 20 wherein said frame is pivotably mounted for moving said separating mechanism between:
 (a) a drainage position with said yolk cup assembly positioned below said cracking mechanism and said albumen pan positioned below said yolk cup assembly, said funnel ring rims and said albumen pan rim being positioned in substantially horizontal planes; and
 (b) a discharge position with said albumen pan behind said yolk cup assembly and said planes containing said funnel ring rims and said albumen pan rim sloping downwardly from back-to-front whereby said egg yolk and albumen contents are discharged from said yolk cup assembly and said albumen pan respectively.

22. In combination with an assembly for cracking eggs and separating the yolk and albumen contents thereof including a support bracket mounting a cracking mechanism, the improvement of a mechanism for separating the egg yolk and albumen contents, which comprises:
 (a) a frame including:
  (1) a cross pin section including a crosspin pivotably mounted on said support bracket along a pivotal axis;
  (2) a yolk cup section extending forwardly from said cross pin section; and
  (3) an albumen pan section extending downwardly from said cross pin section and said yolk cup section;
 (b) a yolk cup assembly including:
  (1) a front;
  (2) a back
  (3) a frusto-elipsoidal, annular funnel ring having a side wall, an upper rim defining a generally circular upper opening and a lower rim defining a generally circular lower opening;
  (4) a concave retaining bowl having a generally circular rim attached to said side wall in proximity to said funnel ring lower rim at said yolk cup assembly back, said retaining bowl rim being positioned in spaced relation above said funnel ring lower rim at said yolk cup assembly front;
  (5) a yolk cup receptacle defined by said side wall and said retaining bowl, said yolk cup receptacle being adapted to receive substantially the entire yolk and albumen contents from said cracking mechanism;
  (6) said retaining bowl rim being partly spaced from said side wall whereby a crescent-shaped receptacle opening is formed between said funnel ring side wall and said retaining bowl rim, said receptacle opening having opposite, converging ends positioned adjacent said yolk cup assembly back;
  (7) said side wall having a slot extending downwardly from and open at said funnel ring upper rim;
  (8) said funnel ring lower rim lying in a plane; and
  (9) said retaining bowl rim lying in a plane that converges rearwardly with respect to said plane containing said funnel ring lower rim;
 (c) an albumen pan mounted on said frame albumen pan section in spaced relation below said yolk cup assembly and adapted to receive said albumen contents from said yolk cup assembly; and
 (d) said separating mechanism being pivotable about said pivotal axis between:
  (1) a drainage position with said yolk cup assembly positioned below said cracking mechanism and said albumen pan positioned below said yolk cup assembly, said funnel ring rims and said albumen pan rim being positioned in substantially horizontal planes; and
  (2) a discharge position with said albumen pan behind said yolk cup assembly and said planes containing said funnel ring rims and said albumen pan rim sloping downwardly from back-to-front whereby said egg yolk and albumen contents are discharged from said yolk cup assembly and said albumen pan respectively.

* * * * *